United States Patent [19]
Abdo

[11] 3,761,054
[45] Sept. 25, 1973

[54] RECIPROCABLE VALVE WITH ROLLING BEARINGS

[75] Inventor: Joseph T. Abdo, Rolling Hills, Calif.

[73] Assignee: Scitech Corporation, Los Angeles, Calif.

[22] Filed: Mar. 24, 1972

[21] Appl. No.: 237,653

[52] U.S. Cl.................. 251/172, 251/174, 251/325, 137/625.18, 137/625.48
[51] Int. Cl........................................... F16k 11/06
[58] Field of Search................. 137/625.18, 625.25, 137/625.48, 625.67, 625.68; 251/172, 174, 251/282, 324, 325, 319

[56] References Cited
UNITED STATES PATENTS

| 2,858,851 | 11/1958 | Holl | 137/625.48 X |
|---|---|---|---|
| 336,980 | 3/1886 | Baker | 137/625.25 |
| 2,980,137 | 4/1961 | Selwood | 251/319 |
| 375,724 | 1/1888 | Bourke | 137/625.25 |
| 58,980 | 10/1866 | Bristol | 137/625.25 |
| 2,063,655 | 12/1936 | Barner | 251/174 |
| 2,840,106 | 6/1958 | Towler et al. | 251/282 X |
| 3,482,816 | 12/1969 | Arnold | 251/174 X |
| 3,530,893 | 9/1970 | Masuda | 137/625.21 X |
| 3,556,151 | 1/1971 | Masuda | 137/625.21 |

Primary Examiner—William R. Cline
Attorney—Newton H. Lee, Jr.

[57] ABSTRACT

A slide valve is supported in a valve body for reciprocal motion on rolling bearing members which support the slide in spaced relation to the internal body walls to prevent frictional engagement of the slide with the body. The slide and body have flow passages including ports having cylindrical seal members through which fluid flows, the seal members having face-to-face end sealing engagement with a flat face on the slide and impose a force normal to the bearing support tending to cause the slide to cock, and the bearings limiting the cocking of the slide.

11 Claims, 6 Drawing Figures

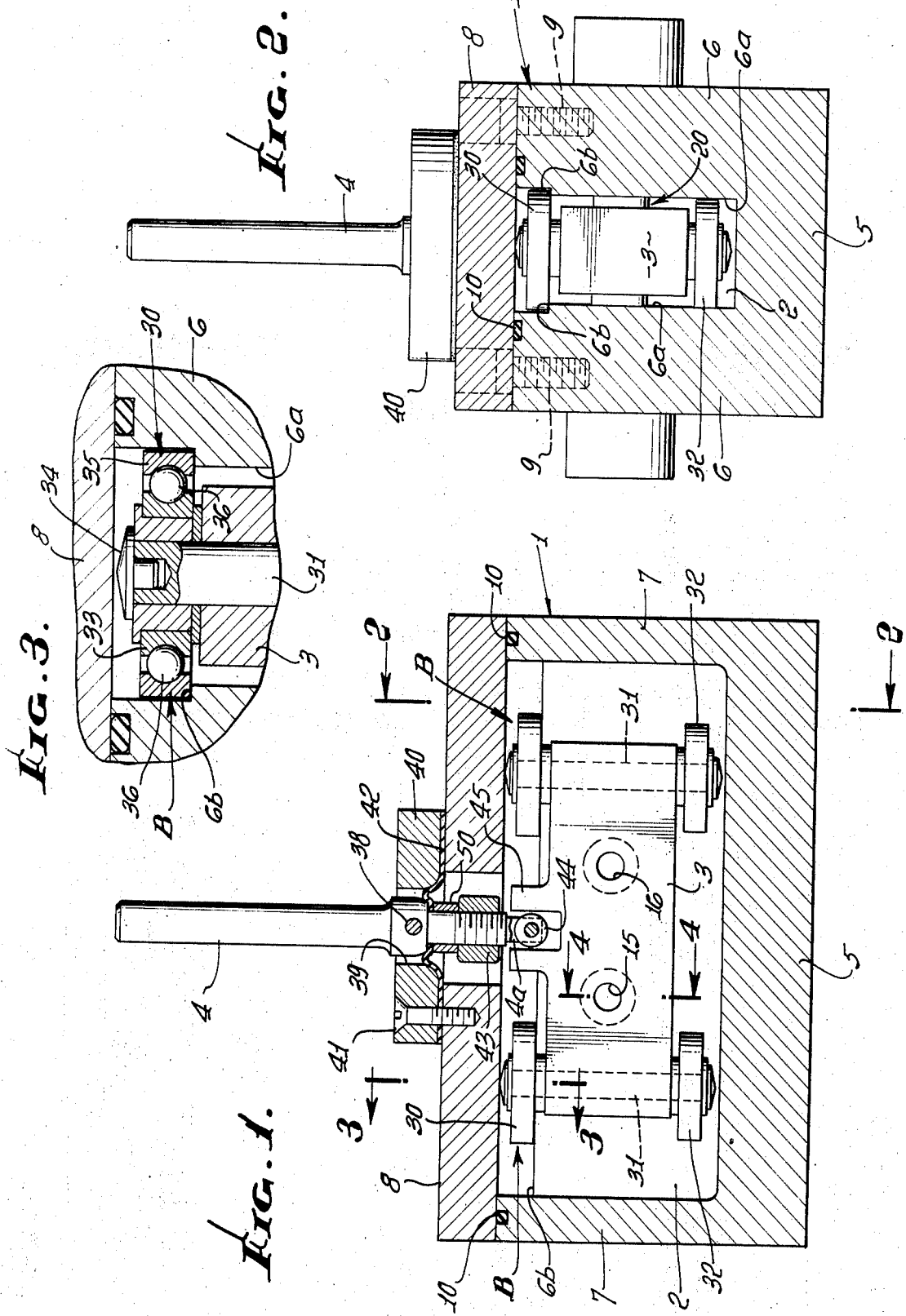

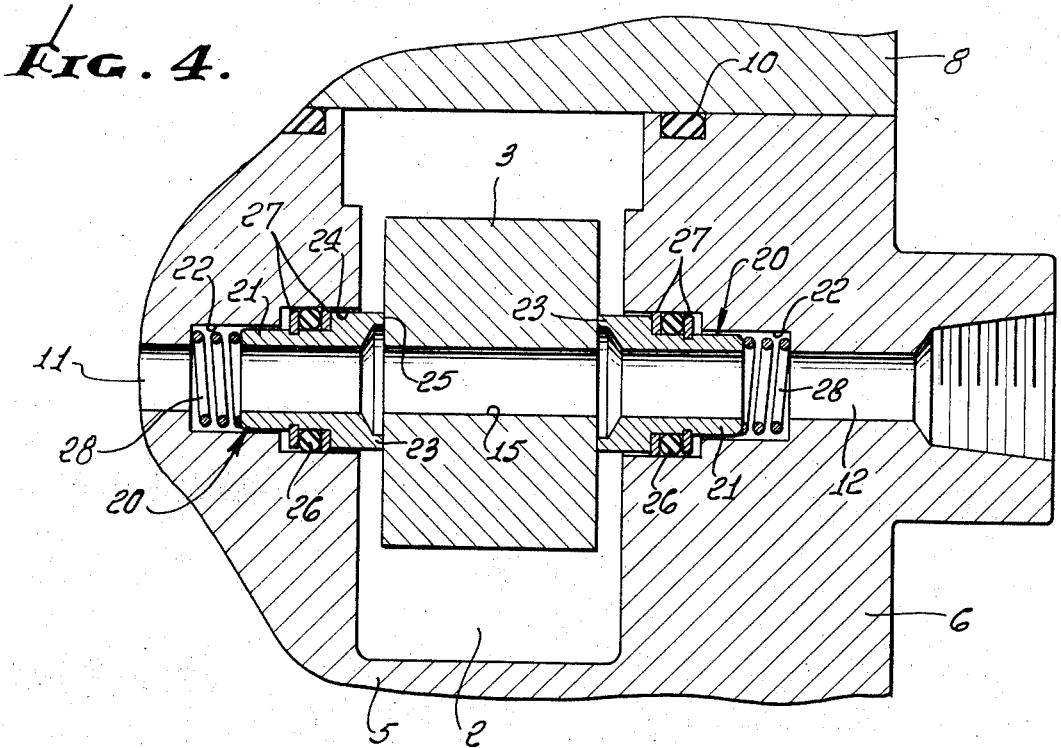
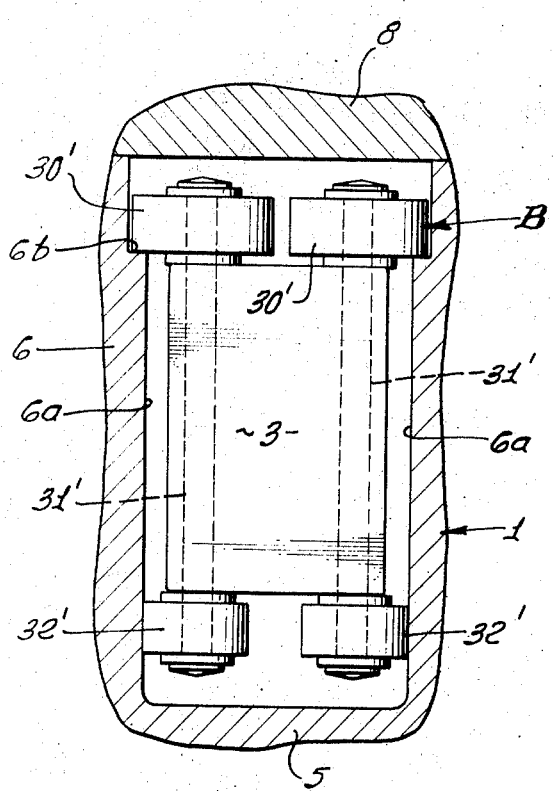
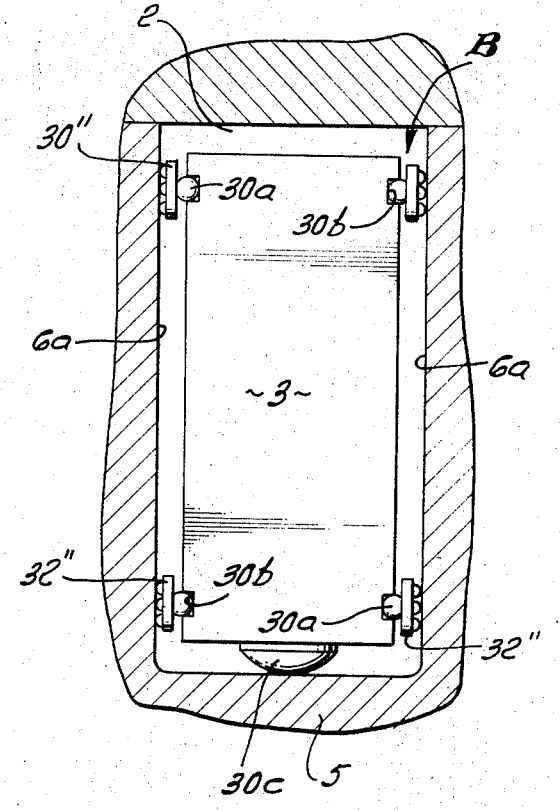

RECIPROCABLE VALVE WITH ROLLING BEARINGS

BACKGROUND OF THE INVENTION

Typical valves useful in fluid pressure systems to control flow have included a slide reciprocable in a valve chamber between different positions to control flow through passages in the body and in the slide, leakage of fluid being prevented by tubular seals circumscribing the body or slide passages and having sealing end faces slidably engaged with the slide or body respectively.

The forces derived from fluid pressure have notoriously rendered the slide difficult to shift when the valve is employed in high pressure service, unless actuator means were employed which were capable of overcoming the friction of the slide in the body and the seals on the slide or body. Such actuators were usually either powerful pressure actuators or solenoids or long levers.

While bearings interposed between the slide and the body are capable of reducing the actuating force required to shift the slide, by reducing friction between the slide and the body and distributing the forces, the use of bearings, in the form of balls or rollers, also poses problems of manufacture, and in some cases, the bearings themselves produce friction which must be overcome. While it may be possible to essentially float the slide in the chamber between the seals and counterbalancing seals, the arrangement of the seals and plungers in many typical flow patterns is complex and seal friction is multiplied. The problem is particularly acute in high pressure valves when the flow direction is such as to produce a force couple tending to cock the slide in the chamber.

SUMMARY OF THE INVENTION

The present invention is directed to slide type valves, wherein tubular seals with sealing end faces confine the flow to the desired passages, and wherein the slide is supported in the valve chamber in a novel manner whereby the slide is easy to shift. The present invention also provides a valve assembly, as aforesaid, which is easy to manufacture. Thus, simple actuator means may be employed and the valve, as a whole, is comparatively inexpensive, yet efficient and easy to operate, either manually or automatically.

In accomplishing the foregoing, the valve of the present invention has bearing means which support the slide in the valve chamber and which are so located and relatively friction free that the slide is easy to shift and the main frictional resistance to movement of the slide is the friction caused by pressure acting on the tubular seals to maintain their end faces in sealing engagement with the companion relatively movable face. Since the friction of such seals is a function of the presence of the fluid medium, the seals may be constructed so as to minimize this friction under various pressure conditions.

More particularly, the slide, in accordance with the invention is supported in the valve chamber adjacent to the ends of the slide by rolling bearings operable in planes transverse to the direction of slide movement and normal to the direction that force is applied to the slide by the tubular seals. These bearings may comprise roller bearings constituting trucks which support the slide for linear movement. These bearings essentially support the slide in spaced relation to the body walls forming the valve chamber and the bearings are so constructed and arranged as to offer little resistance to movement, notwithstanding that fairly large forces may be acting to force the slide towards a body wall, say the force derived from a number of thousands of pounds of fluid pressure acting across an area on the slide determined by the cross-sectional area of the passage through the tubular seal in the inlet port when the valve is in the closed condition. With the increased use of relatively high pressure fluid systems, say between 1,000 and 6,000 PSI, more or less, reduction in the friction caused by deflecting forces applied to the slide becomes ever more important.

This invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

BRIEF OF THE DRAWINGS

FIG. 1 is a vertical section through a slide valve made in accordance with the invention;

FIG. 2 is a transverse section, as taken on the line 2—2 of FIG. 1;

FIG. 3 is a fragmentary transverse section, as taken on the line 3—3 of FIG. 1, showing a typical upper roller, and on an enlarged scale;

FIG. 4 is a transverse section, as taken on the line 4—4 of FIG. 1, showing typical sealing members, and on an enlarged scale;

FIG. 5 is a fragmentary transverse section, showing a modified roller arrangement; and FIG. 6 is a fragmentary transverse section, showing a further modified roller arrangement.

DESCRIPTION OF THE PREFERRED EMBODIMENTS

Referring to FIGS. 1 through 4, the valve of the invention will be seen to comprise a body 1 of generally rectangular form and providing an internal valve chamber 2 in which is disposed a reciprocable slide 3 adapted to be actuated between various selected positions by actuator means including a lever 4. In this form of the valve assembly, the body 1 has a bottom wall 5, side walls 6, and end walls 7 formed as a casting, for example, to which a top wall 8 is applied by suitable fasteners 9, with suitable sealing means 10 being interposed between the top 8 and the side and end walls 6 and 7.

The present invention is directed to valves of the type in which the flow of fluid through the valve is controlled by tubular seals which have sealing end faces slidably engageable with opposed sealing faces on the slide. The flow passages and seals are arranged to provide any typical flow pattern, and indeed, substantially the entire range of flow patterns may be availed of which are typically found in either reciprocating slide valves of the type here involved, or the more complex and less efficient spool valves.

More particularly, in the illustrative valve, the flow pattern involves an inlet port 11 and an outlet port 12 at opposite sides of the valve body, namely, the sides 6, in the present embodiment, and additional ports may be provided for other typical flow patterns. The slide 3 has at least one port or passage 15, and, as shown, another port 16 extending therethrough and spaced apart a distance corresponding to the spacing of the body ports, so that when these ports are aligned upon longitudinal movement of the slide 3 to the position as seen in FIG. 4, fluid flows from the inlet 11 to the outlet 12.

Each of the ports 11 and 12 has a tubular seal 20 clearance a tubular body 21 disposed in a bore 22 and an enlarged annular head 23 disposed in an enlarged bore 24, the head 23 having an end face 25 slidably and sealingly engageable with the opposing flat face of the rectangular slide 3. Annular sealing means are interposed in the bore 24 between the tubular body 21 and the wall of bore 24, in the illustrated form of an O-ring seal 26 which is disposed between a pair of backup rings 27. In the bore 22 is a coiled compression spring 28 seating at the bottom of the bore and on the inner end of the tubular seal 20 to provide a bias to maintain initial sealing engagement of the end face 25 with the slide 3. These tubular seals 20 have clearance in the bores 22 and 24 so as to be capable of cocking in the bores, and in addition, these bores are of sufficient depth, relative to the length of the seal body 21 and heads 23, as to allow the seals to move axially to the necessary extent, all without disturbing the sealing engagement between the end faces 25 and the engaged faces of the slide 3, as the slide shifts longitudinally, and as will be later described, also tends to move laterally of the tubular seals 20.

Essentially, it will now be recognized, that the slide 3 is interposed between the opposing seal elements 20 in such a manner that forces acting axially on the seals 20, caused by fluid pressure and the springs 28, have a tendency to cause the slide 3 to shift laterally in the chamber and to cock therein in many conventional flow patterns. It is these forces in conventional valves which cause problems in the actuation of slide between its selective positions. If the slide is directly guided on surfaces of the body, the drag friction is so high under most useful pressures that the required actuating forces become so high as to require complex and/or powerful actuator means. Under some conditions, even the use of bearing means improve the force problem but the assembly of the bearings in the valve assembly may be complicated and costly.

Thus, the present invention involves the concept of supporting the slide within the valve chamber on what may be characterized as rolling truck bearings, at the ends of the slide, so that the bearings prevent contact of the slide with the opposing body walls, and the bearings take the lateral forces applied to the slide in a direction normal to the imaginary planes in which the bearings operate.

In the embodiment shown in FIGS. 1 through 4, the truck bearings are shown at B as comprising a pair of upper roller or ball bearing assemblies 30 mounted on axles 31 at or adjacent to the opposite ends of the slide 3 and a pair of slide 3 roller or ball bearing assemblies 32 also mounted on the axles 31. The bearing assemblies 30 and 32 are disposed between the opposed inside walls 6a of the valve body 1, and in the embodiment illustrated, the upper bearing assemblies 30 are of larger diameter than the bearing assemblies 32 for engagement with longitudinally extended horizontal shoulders 6b on the walls 6a to vertically support the slide 3. As seen in FIG. 3, a typical bearing assembly 32 will be seen to comprise an inner race 33 affixed to the end of axle 31 by a retainer 34, and an outer race 35, with balls 36 interposed between the bearing races 33 and 35. The outer race 35 engages the shoulder 6b so that the bearing means 32 acts as a thrust bearing means, as well as a rotary bearing means.

Such a bearing means is simple and easy to assemble, but is operable to significantly reduce the force necessary to shift the slide 3. Thus, a simple actuator means may be employed. In the illustrative embodiment, the actuator means is carried by the body top 8. More particularly, the lever 4 is pivoted on a pin 38 in an opening 39 in a plate 40 which is suitably removably mounted on the top 8, as by fasteners 41. A sealing diaphragm 42 is clamped at its outer margin between the plate 40 and top 8 and at its inner margin between a shoulder on the lever 4 and a clamp ring 42 by a clamping nut 43 which is threaded on the lever 4. At its inner end, the lever 4 has an arm 4a which supports a roller 44 which is disposed between ears 45 on the slide 3, whereby pivotal movement of the lever 4 will effect longitudinal movement of the slide 3 to its various positions determined by the flow pattern of the valve.

Referring to FIG. 5, a modified bearing or truck assembly is shown, wherein instead of a single upper roller and a single lower roller, as in the first described embodiment, the bearing means B comprises a pair of smaller, upper rollers 30' mounted on a pair of axles 31', these axles also carrying a pair of smaller, lower rollers 32'. Otherwise, the structure and function of the apparatus is the same as that previously described, and the upper rollers 30' also constitute thrust bearings which suspend the slide 3 on the shoulders 6b on the side walls 6 of the body 1.

Still another embodiment is shown in FIG. 6, wherein the truck bearings B are universally mounted between the body walls 6a and the slide 3, and thereby the loaded rolling elements maintain uniform contact with the walls when the applied forces tend to cause cocking of the slide 3 in the valve chamber. In this embodiment, the bearing means consist of annular ball bearing assemblies 30" and 32", the balls of which are engageable with one of the opposed body and slide walls. The ball bearing cage is universally engaged with a ball support 30a which is engaged in a ball seat 30b in the slide 3. In this embodiment, since the bearing means B are not adapted to support the slide against downward movement into contact with the bottom wall 8 of the body 1, an anti-friction bearing pad 30c is disposed between the slide and the bottom 8 of the valve body. While in the illustrated form, the pad 30c is carried by the slide, it is apparent that the reverse may be true.

From the foregoing, it will now be understood that the invention provides bearings or trucks at the ends of the slide, whereby to take the lateral load applied to the slide by fluid pressure and by the springs 28 acting on the seals 20, so that the slide cannot cock into binding frictional engagement with the inner walls of the body, about an axis extending longitudinally of the slide or about an axis transverse thereto, the bearing means essentially being astraddle the seals where the cocking force is applied.

I claim:

1. A control valve comprising: a body having an elongated chamber closed at its ends, an elongated slide longitudinally shiftably disposed in said chamber, ports providing inlet and outlet passage means in said body, said slide having longitudinally spaced ports providing passage means for conducting fluid between said ports, sealing means interposed between said body and said slide and including tubular seals circumscribing certain of said ports, one of said body and said slide having a flat face through which certain of said ports open, each of said seals having a flat end face engageable with the first-mentioned flat face for controlling the flow of fluid between said passage means through said slide, each of said seals also having its other end face exposed to pressure in its port to apply a force to the seal urging its flat end face into engagement with the first-mentioned flat face, said body having elongated bearing surfaces extending longitudinally in said chamber and opposed to said slide and located in planes normal to the direction of application of force to said slide by said seals, bearing means interposed between said bearing surfaces and said slide, said bearing means being laterally spaced at opposite sides of said ports of said body and said slide for holding said slide against cocking in said chamber into binding engagement with said body under the influence of the force applied to said seals about an axis extending longitudinally of said chamber and about an axis extending transversely of said chamber, and operating means for shifting said slide in said chamber to establish and interrupt fluid flow through said passage means, said bearing means comprising rolling bearings carried at opposite ends of said slide.

2. A valve as defined in claim 1, wherein said bearings comprise roller bearing assemblies at opposite ends of said slide.

3. A valve as defined in claim 1, wherein said bearings comprise roller bearing assemblies at opposite ends of said slide and contacting said bearing surfaces.

4. A valve as defined in claim 1, wherein said bearings comprise roller bearing assemblies at opposite ends of said slide, said roller bearing assemblies being universally carried by said slide and contacting said bearing surfaces.

5. A valve as defined in claim 1, wherein said bearings comprise roller bearing assemblies at opposite ends of said slide, and including bearing means for preventing engagement of said slide with the bottom wall of said body.

6. A valve as defined in claim 1, wherein said bearings comprise roller bearing assemblies at opposite ends of said slide and including an outer race revolvable about an inner race, said outer race engaging said bearing surfaces.

7. A valve as defined in claim 1, wherein said bearings comprise roller bearing assemblies at opposite ends of said slide and including an outer including an revolvable about an inner race, said outer race engaging said body, said body having a shoulder extending longitudinally below said outer race and engaged by the latter for preventing engagement of said slide with the bottom wall of said body.

8. A valve as defined in claim 1, wherein said bearings comprise roller bearing assemblies at opposite ends of said slide, said roller bearing assemblies being universally carried by said slide and engaging said bearing surfaces on the opposed side walls of said body, and including bearing means supporting said slide in upwardly spaced relation to the bottom wall of said body.

9. A valve as defined in claim 1, wherein said bearings comprise roller bearing assemblies at opposite ends of said slide, said roller bearing assemblies comprising pairs of roller bearings carried at opposite side of said slide and engaging said bearing surfaces on opposed walls of said body.

10. A valve as defined in claim 1, wherein said bearings comprise roller bearing assemblies at opposite ends of said slide, said roller bearing assemblies comprising opposed pairs of roller bearings carried at opposite ends of said slide, one pair engaging said bearing surfaces on one body wall and the other pair engaging said bearing surfaces on the other body wall.

11. A valve as defined in claim 1, wherein said bearings comprise ball bearing assemblies, carried at opposite ends of said slide and engaged with opposed walls of said body.

* * * * *